United States Patent [19]

Luke

[11] Patent Number: 4,459,043

[45] Date of Patent: Jul. 10, 1984

[54] REFLECTIVE ELEMENTS AND SENSORS INCLUDING REFLECTIVE ELEMENTS

[75] Inventor: Douglas V. Luke, Farnham Common, England

[73] Assignee: Smiths Industries Public Limited Company, London, England

[21] Appl. No.: 315,596

[22] Filed: Oct. 30, 1981

[30] Foreign Application Priority Data

Nov. 14, 1980 [GB] United Kingdom ............... 8036668

[51] Int. Cl.³ ............................................. G01J 5/08
[52] U.S. Cl. ................................ 374/130; 148/31.5; 350/288; 374/144; 356/43
[58] Field of Search ............ 374/121, 130, 144; 75/124 A, 124 FC, 124 FB; 428/469; 350/310, 292, 288; 148/31.5

[56] References Cited

U.S. PATENT DOCUMENTS

| | | | |
|---|---|---|---|
| 2,464,141 | 3/1949 | Maier | 350/310 X |
| 2,562,864 | 7/1951 | Jury et al. | 374/130 X |
| 3,187,574 | 6/1965 | Mason | 374/130 |
| 3,482,448 | 12/1969 | Gaffard | 374/121 |
| 3,584,509 | 6/1971 | Compton et al. | 374/144 X |
| 3,754,898 | 8/1973 | McGurty | 75/124 FC X |
| 3,852,063 | 12/1974 | Niimi et al. | 75/124 FA |
| 4,101,365 | 7/1978 | Fisli | 350/288 |
| 4,144,380 | 3/1979 | Beltran et al. | 75/124 FB |
| 4,204,862 | 5/1980 | Kado et al. | 148/31.5 X |
| 4,268,124 | 5/1981 | Lui | 350/310 |
| 4,286,134 | 8/1981 | Nakata et al. | 374/121 |
| 4,312,915 | 1/1982 | Fan | 428/469 X |
| 4,337,997 | 7/1982 | Sadoune et al. | 350/310 |
| 4,358,507 | 11/1982 | Senaha et al. | 350/292 X |
| 4,379,196 | 4/1983 | Halper | 350/288 X |

FOREIGN PATENT DOCUMENTS 2250142 4/1974 Fed. Rep. of Germany ...... 374/144

Primary Examiner—Daniel M. Yasich
Attorney, Agent, or Firm—Pollock, Vande Sande & Priddy

[57] ABSTRACT

A radiation pyrometer, or other optical sensor, has a mirror assembly capable of withstanding high temperatures. The mirror assembly is a block of a steel containing between 15 and 20% chromium, 4.0 and 5.2% aluminium, 0.05 and 0.4% yttrium, 0.2 and 0.4% silicon, and 0.00 and 0.03% carbon. A reflective surface on the assembly is provided by an aluminium oxide layer. The assembly is formed by heating a body of the steel such as to produce the aluminium oxide layer which is then polished to a reflective finish. After heating, the body is machined to the desired shape of the mirror assembly.

13 Claims, 2 Drawing Figures

REFLECTIVE ELEMENTS AND SENSORS INCLUDING REFLECTIVE ELEMENTS

BACKGROUND OF THE INVENTION

This invention relates to reflective elements and methods of making such elements, and to sensors including such elements.

Radiation pyrometers are sensors used for measuring the temperature of objects in high-temperature environments such as, turbine blades in a gas-turbine engine, or articles in a furnace. The optical components of such pyrometers must be capable of performing satisfactorily at the high-temperatures involved and, in this respect, lenses and windows can be made, for example, of sapphire of fused silica. A problem arises, however, in certain applications where it is not possible for the pyrometer or other sensor to be directly aligned with the object under observation. This can occur especially when it is desired to view the blades of a gas-turbine engine. In such circumstances it is necessary to deflect the radiation from the object into the sensor such as by use of a mirror, prism or other radiation guide. Because of the high temperatures involved in engines of this kind it has been difficult to construct such radiation guides that will perform satisfactorily. For example, conventional metal or metal-coated mirrors can oxidize rapidly with consequent loss of reflectivity. Prisms will be subject to problems caused by differential thermal expansion with respect to the component on which they are mounted, thereby rendering a secure mounting difficult to achieve.

BRIEF SUMMARY OF THE INVENTION

It is an object of the present invention to provide a reflective element and a method of manufacture of a reflective element that can be used to alleviate the above-mentioned problems.

According to one aspect of the present invention there is provided a reflective element of a steel containing chromium, aluminium and yttrium, said element having a reflective surface that is provided by an aluminium oxide layer.

The aluminium oxide layer remains reflective at high temperatures and is resistant to erosion.

The steel may contain between 15 and 22% chromium, 4.0 and 5.2% aluminium, and 0.05 and 0.4% yttrium. Additionally, the steel may contain between 0.2 and 0.4% silicon, and 0.00 and 0.03% carbon.

According to another aspect of the present invention there is provided a method of making a reflective element comprising the steps of providing a member of a steel containing chromium, aluminium and yttrium; heating at least a surface of the member such as to produce a surface layer of aluminium oxide; and giving the surface of said layer the desired reflective finish.

The member may be machined to the desired shape and size at least in part after producing said surface layer of aluminium oxide.

The reflective member may be included in a radiation sensor together with radiation sensing means, the reflective surface of the element being arranged to direct radiation to the sensing means. In this respect, the sensor may, for example, be a radiation pyrometer or a turbine-blade speed sensor.

A radiation pyrometer including a reflective element, and a method of making a reflective element, in accordance with the present invention, will now be described, by way of example, with reference to the accompanying drawings.

DETAILED DESCRIPTION

Figure 1:
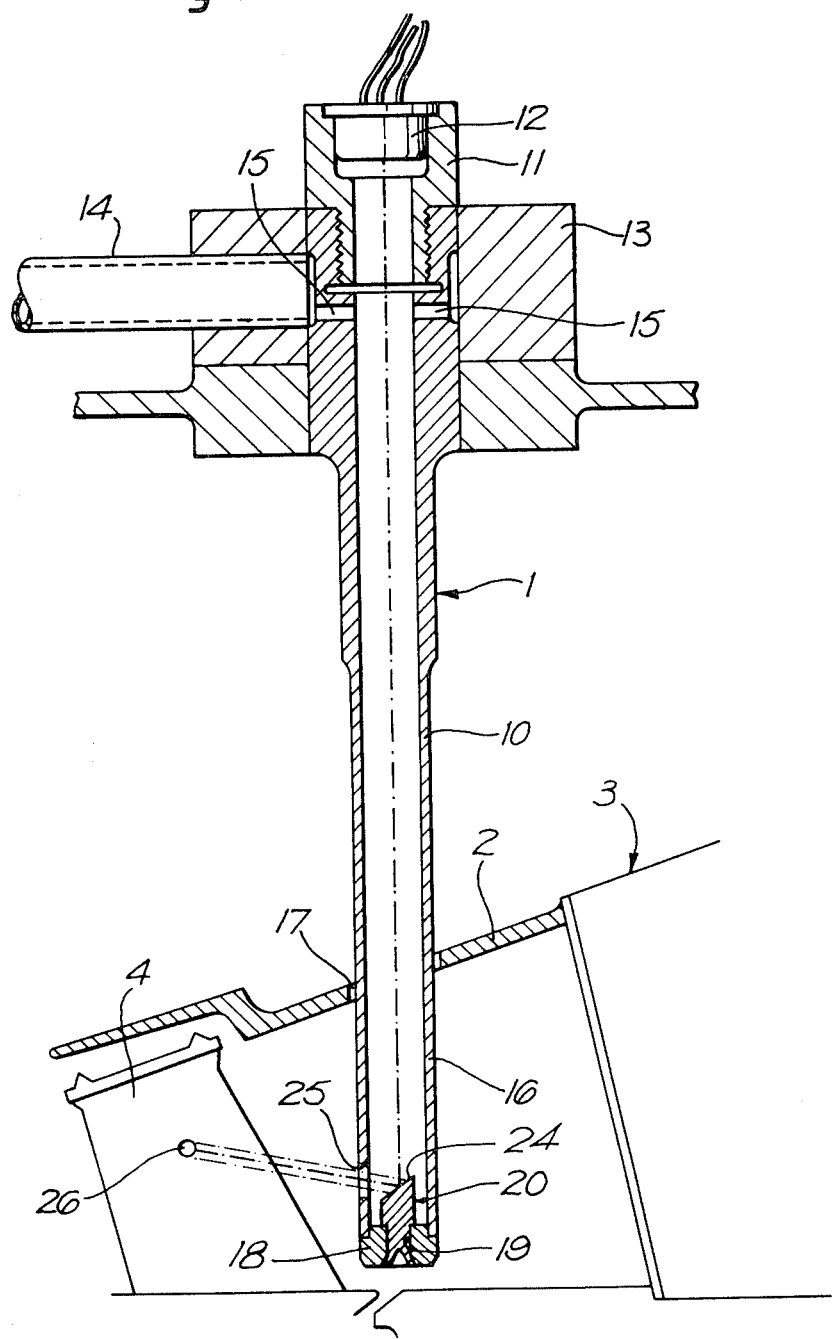
FIG. 1 is a partly sectional side-elevation of the pyrometer in position on a gas-turbine engine.

With reference to FIG. 1, the radiation pyrometer 1 is mounted on the casing 2 of a gas-turbine engine 3 for observation of the turbine blades 4.

The pyrometer 1 includes a Nimonic metal tube 10 the rear end 11 of which is open and receives an infrared radiation photosensor 12, aligned axially of the tube (although it will be appreciated that a fibre-optic cable could be used to supply radiation from the pyrometer to a remote sensor). The rear end 11 of the tube 10 is surrounded by a coupling member 13 to which a pressurised air-line 14 is connected. Cooling air is passed down the inside of the tube 10 via apertures 15 that open from the coupling member 13 into the tube.

The forward end 16 of the pyrometer 1 projects through an opening 17 in the engine casing 2. A cylindrical Ninomic plug 18 is electron beam welded in the forward end 16 of the tube 10. The plug 18 has a central aperture 19 that is flared open at its forward end and that serves for mounting a mirror assembly 20.

Figure 2:
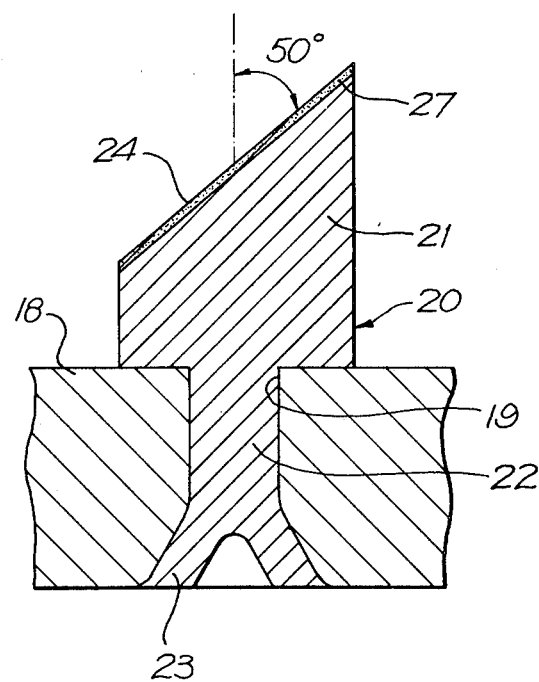
FIG. 2 is a schematic diagram showing the reflective element in greater detail.

The mirror assembly 20 is shown in greater detail in FIG. 2, being a unitary assembly of Fecralloy (Registered Trade Mark) alloy, that is, a steel containing 15.0 to 22.0% chromium, 4.0 to 5.2% aluminium, 0.05 to 0.4% yttrium, 0.2 to 0.4% silicon and 0.00 to 0.03% carbon. The assembly comprises an upper cylindrical body portion 21 from which depends a cylindrical root portion 22 of reduced diameter that is flared outwardly (such as, by rivetting) at its lower end to form a skirt portion or rivet 23 that keys with a flared forward end of the aperture 19 so as to key the mirror in position. The body portion 21 sits on the plug 18 and has a reflective upper surface 24 that is inclined at an angle of 50° to the pyrometer axis.

A circular viewing port 25 (FIG. 1) is provided in the wall of the tube 10, adjacent the upper surface 24 of the mirror assembly 20, through which infra-red radiation from a location 26 in the path of engine turbine blades 4 falls on the mirror assembly. The reflective surface 24 directs the radiation along the axis of the tube 10 to the sensor 12. Cooling air passing down the inside of the tube 10 emerges through the port 25 into the engine 3.

The reflective surface of the mirror assembly 20 is formed with a thin protective layer 27 of aluminium oxide, in a manner described later, although the protective layer could be formed over the entire surface of the assembly.

The protective layer 27 is hard and erosion resistant, serving to protect the reflective surface 24 from erosion by combustion products. The material from which the mirror assembly 20 is made remains stable and the layer 27 remains reflective at temperatures of around 1000° C. making it ideal for the environment of a gas-turbine engine. The air passing down the tube 10 flows over the mirror assembly 20 serving to cool it to a certain extent and also to maintain the reflective surface 24 free from combustion products such as soot.

The mirror assembly 20 is manufactured by appropriately heat treating a solid body of Fecralloy to produce a surface layer of aluminium oxide and then machining the body to the desired shape, but without removing the surface layer from what is to be the reflective surface 24. The heat treatment comprises raising the temperature of the body to about 1150° C. in an oxidising atmosphere. This causes the aluminium in the material to diffuse to the surface where it is oxidized thereby forming the aluminium oxide surface layer 27 over the entire body. After machining to the correct shape the surface layer 27 on the inclined face is lapped and polished to a mirror finish so as to provide the reflective surface 24 of the mirror assembly 20. Because the surface layer 27 is formed initially on a relatively large body there is a correspondingly large amount of aluminium in the body that can diffuse to the surface. This results in a thicker aluminium oxide layer than would be produced by a smaller body such as formed by machining the mirror assembly to shape prior to heat treatment.

The thicker layer enables the surface to be polished without risk of entirely removing the aluminium oxide layer 24.

It will be appreciated that the reflective surface 24 need not necessarily be flat but could be contoured so as to focus incident radiation. The surface 24 need not be specularly reflecting but could instead be diffusely reflecting.

In place of a solid block of material a reflective element could be provided by coating a substrate with the metal composition referred to above and then heat treating it to produce a surface layer of aluminium oxide.

The reflective element according to the present invention could be used in applications other than radiation pyrometers where resistance to high temperature or abrasion is desirable. One example of such an application is a turbine-blade speed sensor where a beam of radiation is directed into the region of the turbine blades. As the blades rotate they pass through the radiation beam, reflecting radiation back to the sensor. The speed sensor is of similar construction to the pyrometer described above, a reflective element according to the present invention being mounted at the tip of the sensor to direct the transmitted energy onto the blades and the reflected energy along the sensor.

What I claim is:

1. A reflective element of a steel containing chromium, aluminium and yttrium that is heat treated so as to provide an aluminum oxide surface, said surface polished so as to be specularly reflective.

2. A reflective element according to claim 1, wherein said steel contains between 15 and 22% chromium, 4.0 and 5.2% aluminium and 0.05 and 0.4% yttrium.

3. A reflective element according to claim 2, wherein said steel also contains between 0.2 and 0.4% silicon and 0.00 and 0.03% carbon.

4. A reflective element according to claim 1, wherein said element is a solid body of substantially prismatic shape, and wherein said reflective surface is inclined to the axis of said body.

5. A radiation sensor including photosensing means for sensing radiation and a reflective element, said element having a specularly reflective surface arranged to direct radiation towards said photosensing means, wherein said reflective element is of a steel containing chromium, aluminium and yttrium that is heat treated so as to provide an aluminum oxide surface said surface polished so as to be specularly reflective.

6. A radiation pyrometer including photosensing means for sensing radiation and a reflective element, said element having a specularly reflective surface arranged to direct radiation towards said photosensing means, wherein said reflective element is of a steel containing chromium, aluminium and yttrium that is heat treated so as to provide an aluminum oxide surface, said surface polished so as to be specularly reflective.

7. The radiation sensor of claim 5 wherein said steel contains between 15 and 22% chromium, 4.0 and 5.2% aluminum, and 0.05 and 0.4% yttrium.

8. The radiation sensor of claim 7 wherein said steel also contains between 0.2 and 0.4% silicon and 0.00 and 0.03% carbon.

9. The radiation sensor of claim 5 wherein said reflective element is a solid body of substantially prismatic shape and wherein said reflective surface is inclined to the axis of said body.

10. The radiation pyrometer of claim 6 wherein said steel contains between 15 and 22% chromium, 4.0 and 5.2% aluminum, and 0.05 and 0.4% yttrium.

11. The radiation pyrometer of claim 10 wherein said steel also contains between 0.2 and 0.4% silicon and 0.00 and 0.03% carbon.

12. The radiation pyrometer of claim 11 wherein said reflective element is a solid body of substantially prismatic shape and wherein said reflective surface is inclined to the axis of said body.

13. The radiation pyrometer of claim 6 wherein said reflective element is a solid body of substantially prismatic shape and wherein said reflective surface is inclined to the axis of said body.

* * * * *